United States Patent [19]

Hertrich et al.

[11] Patent Number: 4,902,268

[45] Date of Patent: Feb. 20, 1990

[54] BELT TENSIONING DEVICE

[75] Inventors: Steffen Hertrich, Herzogenaurach; Dieter Goppelt, Aurachtal, both of Fed. Rep. of Germany

[73] Assignee: INA Walzlager Schaeffler KG, Fed. Rep. of Germany

[21] Appl. No.: 337,947

[22] Filed: Apr. 14, 1989

[30] Foreign Application Priority Data

May 18, 1988 [DE] Fed. Rep. of Germany ....... 3816889

[51] Int. Cl.⁴ .............................................. F16H 7/08
[52] U.S. Cl. ................................................... 474/135
[58] Field of Search ............... 474/101, 109, 110, 111, 474/113–117, 133, 135, 136, 138

[56] References Cited

U.S. PATENT DOCUMENTS

| 4,539,001 | 9/1985 | Okabe | .............................. | 474/110 X |
| 4,790,796 | 12/1988 | Okabe et al. | .......................... | 474/110 |

*Primary Examiner*—Thuy M. Bui
*Attorney, Agent, or Firm*—Bierman and Muserlian

[57] ABSTRACT

A tensioning device for belts, chains and the like particularly for the camshaft drive of an internal combustion engine, with a tension pulley supported on a movable carrier, with a control element, by which in the case of heating, the carrier can be moved via an actuating element against the action of a pressure spring in the slackening direction of the belt characterized in that, the control element consists of a hollow cylindrical sleeve closed at the one end by a bottom and on the other end has a flange extending radially inwards, against which from the inside a washer abuts, which in its center receives a longitudinally movable and sealed pressure piston, in the annular hollow space between the bore of the sleeve and the pressure piston, the pressure spring is arranged whereby it is supported on one hand on the washer and on the other hand on the pressure piston, between the bottom and the pressure piston, whose end face is at a distance from the bottom, a further pressure spring is arranged which with lower resilience opposes the action of the first mentioned pressure spring and the whole inner area of the sleeve is filled with a gas-free expansion fluid and a method of assembling the same.

10 Claims, 3 Drawing Sheets

BELT TENSIONING DEVICE

STATE OF THE ART

With the use of belt or chain drives on machines which are subject to temperature variations, for example on internal combustion engines, increases in the distances between the axes of the driving and the driven belt pulleys occur as a result of heat expansion, so that the belt tension can rise to undesirably high values. Tensioning devices are used to even out such increases in tension. DE-OS 2,535,676 describes a tensioning device in which the temperature dependent control element acts on a two-armed pivoting lever which is connected to the carrier of the tension pulley via a resilient block acting as a pressure spring. The control element is composed in this case of a thermocouple with a sensor and a motor as an adjusting device, which motor brings about an axial displacement of an adjusting element and by this, a movement of the pivoting lever as a function of the change in temperature.

A tension device is known from EP-OS 0,038,233 which adjusts the position of a tension pulley as a function of the temperature and the control element is formed as a heat expansion cylinder acting against the action of a helical pressure spring on an eccentrically supported annular carrier of a tension pulley. With rising temperature, the tension pulley is displaced in the slackening direction and the control element and the pressure spring are thereby arranged spacially apart from each other and act on the carrier at different points. This reference gives no details as to the internal design of the heat expansion cylinder.

For exact functioning of a pressure-medium cylinder as the control element in which the temperature dependent expansion of a pressure fluid, for example a hydraulic oil, is to be utilized to displace a piston rod and by this, to displace a tension pulley carrier, it is necessary that a complete filling of the cylinder with oil is carried out so that no air bubbles remain therein. In contrast to fluids, air is compressible, and a constant holding force for the tension pulley pivot lever on the cylinder piston during operation would not be guaranteed due to air occlusions in the hydraulic cylinder. In addition, the pressure forces which occur in a gas when heated are different from those which occur in a fluid. Through the presence of air in the hydraulic cylinder, therefore its exact operating mode would be impaired.

For the filling of the pressure fluid into the pressure-medium cylinder and for the subsequent closing of the latter, it is obvious to provide a filling screw which could be screwed into a threaded bore of the cylinder. However, thereby not only would the material and manufacturing costs for the cylinder be increased but also the absolute freedom from gas required in this instance of the filled hydraulic oil would not be guaranteed.

OBJECTS OF THE INVENTION

It is an object of the invention to provide a belt tensioning device of this type wherein the control element for the tensioning device can be simply and safely filled with oil free of gas occlusions.

This and other objects and advantages of the invention will become obvious from the following detailed description.

THE INVENTION

The novel belt tensioning apparatus of the invention particularly for the camshaft drive of an internal combustion engine, with a tension pulley supported on a movable carrier, with a control element, by means of which in the case of heating, the carrier can be moved via an actuating element against the action of a pressure spring in the slackening direction of the belt is characterized in that, the control element consists of a hollow cylindrical sleeve closed at the one end by a bottom and on the other end has a flange extending radially inwards, against which from the inside a washer abuts, which in its center receives a longitudinally movable and sealed pressure piston, in the annular hollow space between the bore of the sleeve and the pressure piston, the pressure spring is arranged whereby it is supported on one hand on the washer and on the other hand on the pressure piston, between the bottom and the pressure piston, whose end face is at a distance from the bottom, a further pressure spring is arranged which with lower resilience opposes the action of the first mentioned pressure spring and the whole inner area of the sleeve is filled with a gas-free expansion fluid.

This problem is solved according to the invention in that the control element consists of a hollow cylindrical sleeve which is closed at the one end by a bottom and on the other end has a flange directed radially inwards against which from inside a washer abuts, which at its center receives sealed and longitudinally movable a pressure piston, that in the annular hollow space between the bore of the sleeve and the pressure piston the pressure spring is arranged which is supported on one hand on the washer and on the other hand on the pressure piston, that between the bottom and the pressure piston, the end face of which is at a distance from the bottom, a further pressure spring is arranged which acts with less resilience against the first mentioned pressure spring and that the entire inner area of the sleeve is filled with a gas-free expansion liquid.

The washer loaded by the pressure spring and acting as a support ring can be axially supported within the sleeve by a sealing ring on a swaged over rim of the sleeve forming the flange and the result is a secure closing of the sleeve by simple means. By axial displacement of the washer within the sleeve, it is possible in a simple way to open or close the sleeve so that additional design measures for the filling of the expansion liquid and for the discharge of air are not necessary. For this, a U-bracket can be inserted into an annular groove of the pressure piston on which the support ring with its external front face is axially supportable so that the displacement of the washer can occur by the pressure piston on which it is then retained by the U-bracket and the pressure spring.

The pressure spring surrounding the pressure piston can be made of several diaphragm springs, whereas the other pressure spring which is supported on the bottom can be a helical spring. As long as the U-bracket is on the pressure piston, the other pressure spring by means of the pressure piston and/or by its first diaphragm spring, holds the support ring in the closed position of the sleeve. Only when, against the action of the other pressure spring, the pressure piston with the support ring is pressed into the sleeve does the opening of the sleeve take place. This closing with the aid of the other pressure spring is necessary to prevent hydraulic oil from escaping and air from flowing into the sleeve once the sleeve has been filled with hydraulic oil.

The support ring can have at least one longitudinal channel closed by the sealing ring through which channel, in the open position when the sleeve is filled, air can escape to the outside and the expansion or pressure fluid (the hydraulic oil) can flow into the sleeve. The pressure piston can be connected for instance by an annular membrane with the support ring or can be sealed in the bore of the support ring by means of a seal which is situated in an inner annular groove of the support ring. In this way, if the sleeve is closed and if heating occurs, the pressure piston can be pushed out of the sleeve slightly as a result of the thermal expansion of the pressure fluid. Thereby, either the position of the membrane alters or the piston slides along the seal of the support ring.

The U-bracket inserted into an annular groove of the pressure piston is required for the assembly of the control element whereby the bracket axially supports the support ring on its front face situated outside the sleeve. In this condition, the pressure spring whch surrounds the pressure piston is pre-loaded between the support ring and the end of the pressure piston. Since the support ring is secured by the U-bracket on the pressure piston, the pressure spring cannot expand. It is therefore fixed on the piston and on the support ring. Instead of the U-bracket, another usual method of fixing can also be selected. The pressure piston with the preloaded pressure spring and the support ring are inserted into the sleeve and the swaging of the sleeve rim is done subsequently.

For the filling with hydraulic oil, the sleeve with protruding piston can be put into a receptacle partly filled with hydraulic oil whereby it is completely immersed in the oil together with the support ring. Via the pressure piston, the support ring is then pushed into an opening position of the sleeve and released after air has escaped from the sleeve and oil has flowed in. The other pressure spring now closes the sleeve. After that, by heating the thus assembled control element, the pressure piston can be slightly pushed axially out of the sleeve as a consequence of the thermal expansion of the fluid. The U-bracket thereby comes off the support ring and can be removed. As a function of the temperature, an equilibrium of forces is now established between the action of the pressure springs and the expansion condition of the pressure fluid. The control element is ready for use.

Referring now to the drawings.

DESCRIPTION OF THE PREFERRED EMBODIMENT

Figure 1:
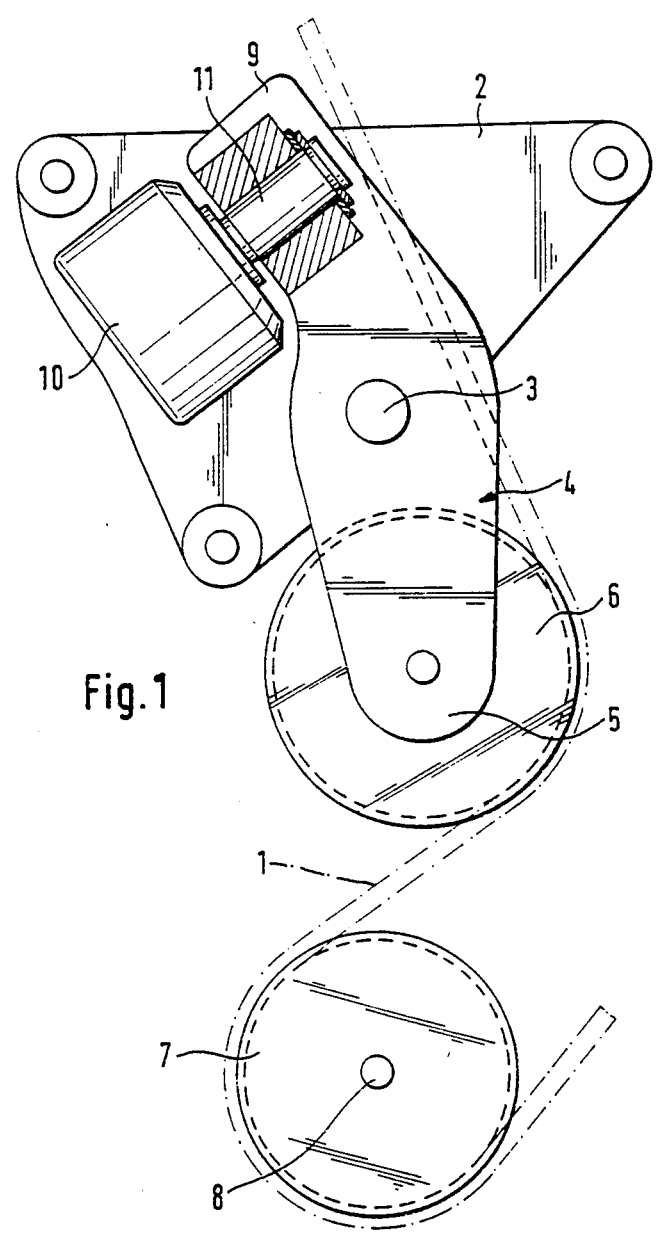
FIG. 1 is a schematic view of a tensioning device of the invention with a belt fitted round a belt pulley and a tension pulley.

Referring to FIG. 1, a tensioning device of the invention for the belt 1 of the camshaft drive of an internal combustion engine has a base plate 2 fixable on the engine on which a pivoting lever 4 is supported around a fixed pivot pin. On a lower arm 5 of the pivoting lever 4, a tension pulley 6 is supported with which the belt 1 extending from a pulley 7 on the axis 8 of the crankshaft to the camshaft, which is not shown, is tensioned.

A control element 10 fixed on the base plate 2 acts by a pressure piston 11 on an upper arm 9 of the pivoting lever 4. When the pressure piston 11 moves out of the housing of the control element 10, a swivelling of the pivoting lever 4 is caused in a direction opposite to the tensioning direction of the tension pulley 6. With the increasing distance between the axes of the camshaft and of the crankshaft resulting from the heating of the internal combustion engine during operation, the pre-load of the belt 1 rises. This rise in the belt tension is compensated by the lifting of the pressure piston 11 and the associated swivelling of the tension pulley 6 in a slackening direction. When cooling takes place, the pressure piston 11 moves back and thereby pulls the upper arm 9 of the pivoting lever 4 in the opposite direction so that the tension pulley 6 moves in the tensioning direction of the belt 1. This keeps the preload of the belt 1, which in itself decreases during cooling, at a constant level.

Figure 2:
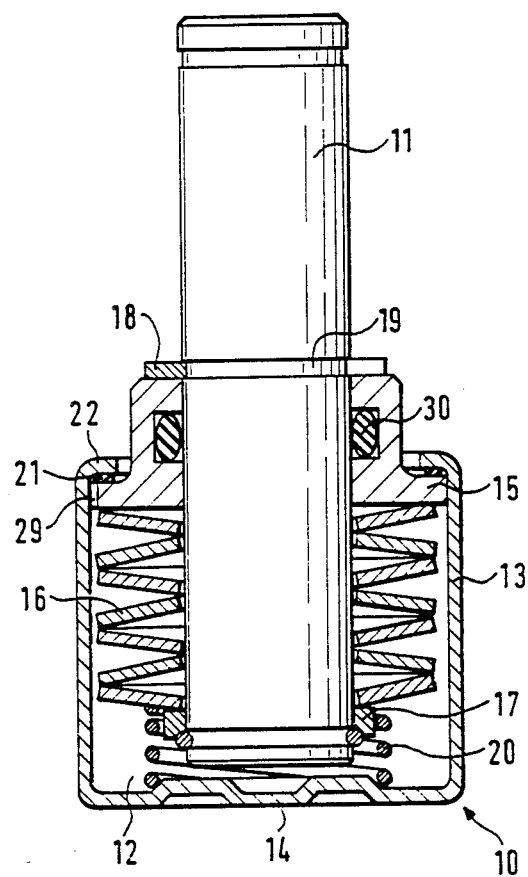
FIG. 2 is a control element of the tensioning device in longitudinal cross-section and FIG. 3 is a vertical cross-section through a container in which several assembled control elements are simultaneously filled with the pressure fluid.

The control element 10 is formed as a hydraulic cylinder which has an area 12 for a pressure fluid formed by a cylindrical sleeve 13 which is closed on one front end by a bottom 14. A pre-assembled unit comprising the pressure piston 11, a support ring 15 and a pack of diaphragm springs 16 is axially inserted through the other open end of the sleeve 13. The diaphragm springs 16 guarantee a high resilience in a small design space and form the pressure spring surrounding the pressure piston 11, which spring is supported according to FIG. 2 on one end of the pressure piston 11 on a retaining ring 17 and which presses with its other end against the support ring 15. Outside the sleeve 13, the support ring 15 is held in place on the pressure piston 11 with the aid of a U-bracket 18 which is fitted into an annular groove 19 of the pressure piston 11. Between the bottom 14 of the sleeve 13 and the bottom most diaphragm spring 16, there is a helical spring 20 as further pressure spring.

After the insertion of the helical spring 20 and of the pressure piston 11 with the diaphragm springs 16, the support ring 15 and the U-bracket 18 into the sleeve 13, in the outer edge area of the support ring 15 a sealing ring 21 is inserted into the sleeve 13, the outer diameter of which corresponds to the inner diameter of the sleeve 13. Following this, a swaged rim 22 is formed on the sleeve as an abutment surface for the sealing ring 21. The helical spring 20 now presses the pressure piston 11 with the diaphragm springs 16 so far in the axial direction until the support ring 15 with its flange situated in the cylindrical sleeve 13 abuts on the sealing ring 21 whereby the sleeve 13 is closed.

Figure 3:
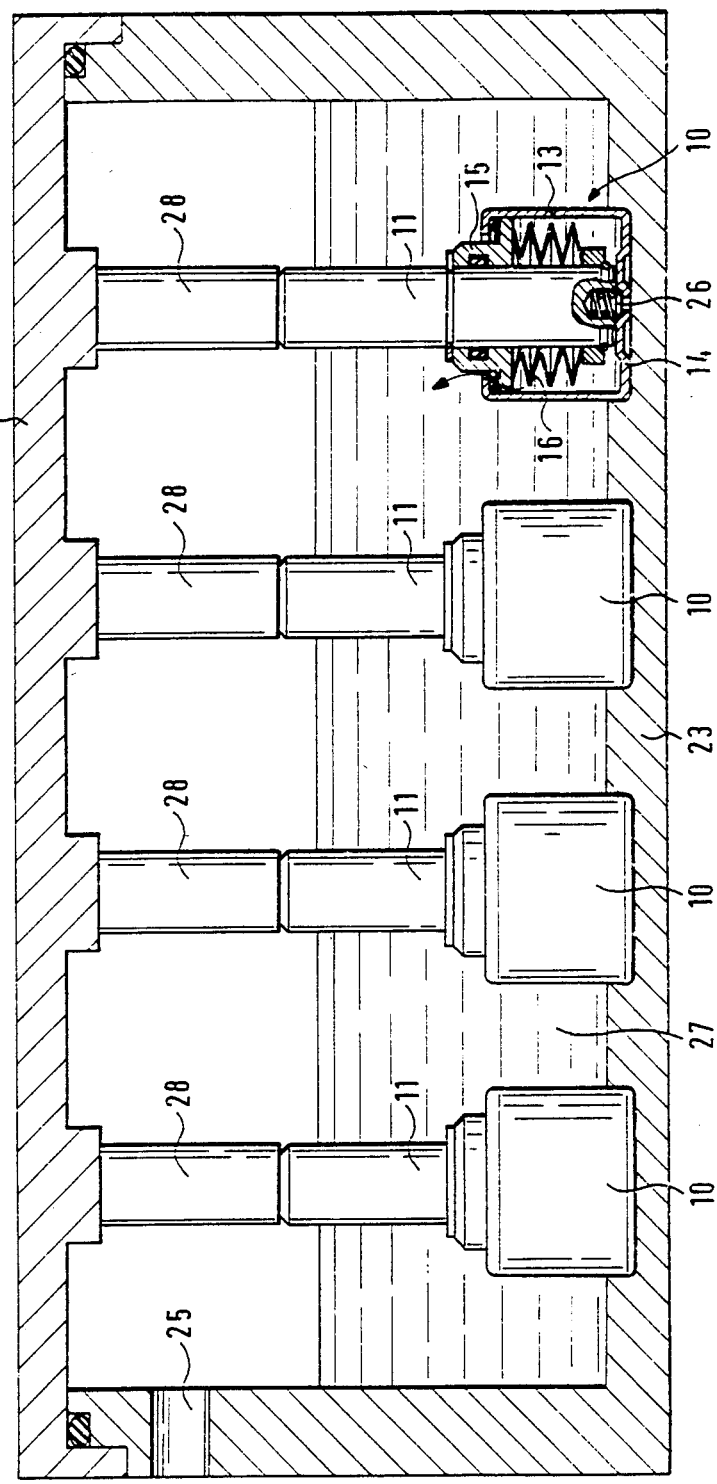

For the filling with pressure fluid, several control elements 10 can be placed simultaneously into a device according to FIG. 3 formed as an evacuation vessel 23 with a lid 24 and with an air suction opening 25. Here, a control element 10 is shown in longitudinal section and the additional pressure spring is arranged as helical spring 26 partially in an end face bore of the pressure piston 11. Within the evacuation vessel 23, there is pressure fluid 27 with a fluid level at which all control elements 10 inserted with vertical axis and bottom 14 downwards are completely immersed with their sleeves 13 and the protruding support rings 15. For each pressure piston 11 protruding with its upper end from the fluid, a punch 28 is provided on the lid 24 which punch in the closed condition of the evacuation vessel 23 pushes the pressure piston 11 with the support ring 15 and the diaphragm springs 16, against the action of the helical spring 26, into the opening position of the cylindrical sleeve 13. Every support ring 15 has in the area of the sealing ring 21 at least one longitudinal channel 29 through which the air contained in the sleeve 13 can now rise and escape from the sleeve 13. Pressure fluid 27 can then flow into the sleeve 13 through the longitudinal channel 29 discernible in FIG. 2.

To assure with great certainty that all air which could disturb the subsequent operation of the control element 10 because of its compressibility escapes completely from every sleeve 13 so that its free volume is filled exclusively with pressure fluid, the space above the fluid level in the vessel is evacuated via the air suction opening 25. After this procedure, that is to say, when atmospheric pressure once again prevails in the vessel, the lid 24 is removed and the helical spring 20 or 26 displaces the support ring 15 onto the sealing ring 21 and thus brings about the closing of the sleeve 13.

The control elements 10 filled with pressure fluid can now be taken from the evacuation vessel 23 and to make them ready for operation, it is necessary to remove the U-bracket 18 in each case. This is done by heating whereby the pressure fluid in the area 12 expands and pushes the pressure piston 11 in the sleeve 13 axially to the outside in opposition to the action of the diaphragm springs 16. During this movement, the piston 11 slides along a seal 30 which is arranged in an inner annular groove of the support ring 15. The U-bracket 18 has now freed itself from the support ring 15 and can be removed from the annular groove 19. During cooling, the diaphragm springs 16 push the pressure piston 11 back into the sleeve 13 to the same extent as the volume of the pressure fluid contained in the area 12 contracts. The control element 10 is ready for use. There is an equilibrium of forces between the diaphragm springs 16 on one hand and the helical spring 20 or 26 and the fluid pressure force on the other hand. By the arrangement of the pressure spring with the diaphragm springs 16 in the control element 10, a pre-assembled unit results whch can easily be replaced in case of wear. This pressure spring and the additional pressure spring 20, 26 which, however, is needed only for assembly, are arranged within the control element 10 protected against outside influences.

Various modifications of the apparatus and method of the invention may be made without departing from the spirit or scope thereof and it is to be understood that the invention is intended to be limited only as defined in the appended claims.

What we claim is:

1. A tensioning device for belts, chains and the like particularly for the camshaft drive of an internal combustion engine, with a tension pulley supported on a movable carrier, with a control element, by means of which in the case of heating, the carrier can be moved via an actuating element against the action of a pressure spring in the slackening direction of the belt characterized in that, the control element consists of a hollow cylindrical sleeve closed at the one end by a bottom and on the other end has a flange extending radially inwards, against which from the inside a washer abuts, which in its center receives a longitudinally movable and sealed pressure piston, in a annular hollow space between a bore of the sleeve and the pressure piston, the pressure spring is arranged whereby it is supported on one hand on the washer and on the other hand on the pressure piston, between the bottom and the pressure piston, whose end face is at a distance from the bottom, a further pressure spring is arranged which with lower resilience opposes the action of the first mentioned pressure spring and the whole inner area of the sleeve is filled with a gas-free expansion fluid.

2. A tensioning device of claim 1 wherein the washer acted on by the pressure spring and operating as support ring is axially supported within the sleeve by a sealing ring on a swaged over sleeve rim forming the flange.

3. A tensioning device of claim 1 wherein a U-bracket is insertable in an annular groove of the pressure piston on which bracket the support ring is axially supportable with its outer front face.

4. A tensioning device of claim 1 wherein the pressure spring surrounding the pressure piston is formed from several diaphragm springs, whereas the further pressure spring which is supported on the bottom is a helical spring.

5. A tensioning device of claim 1 wherein the support ring has at least one longitudinal channel closed by the sealing ring.

6. A tensioning device of claim 1 wherein the pressure piston, displaceable relative to the support ring, is connected via an annular membrane to the support ring.

7. A tensioning device of claim 1 wherein the pressure piston, displaceable relative to the support ring, is sealed in the bore of the support ring with a seal situated in an internal annular groove of the support ring.

8. A process for the manufacture of a control element for a tensioning device for belts, chain or the like, in particular for the camshaft drive of an internal combustion engine with a tension pulley supported on a movable carrier, with a control element, by means of which in the case of heating, the carrier can be moved via an actuating element against the action of a pressure spring in the slackening direction of the belt characterized in that, the control element consists of a hollow cylindrical sleeve closed at the one end by a bottom and on the other end has a flange extending radially inwards, against which from the inside a washer abuts, which in its center receives a longitudinally movable and sealed pressure piston, in an annular hollow space between the bore of the sleeve and the pressure piston, arranging the pressure spring so that it is supported on one hand on the washer and on the other hand on the pressure piston, between the bottom and the pressure piston, whose end face is at a distance from the bottom, arranging a further pressure spring which with lower resilience opposes the action of the first mentioned pressure spring and sealing the whole inner area of the sleeve with a gas-free expansion fluid, inserting the pressure pistion assembled with a retaining ring, the diaphragm springs, the support ring and the U-bracket, with the helical spring and sealing ring into the sleeve, swagging over sleeve rim and inserting the thus assembled unit with protruding pressure piston into a vessel partially filled with hydraulic oil, immersing the sleeve with the support ring completely in the oil, the pressure piston presssing the support ring into an opening position of the sleeve and releasing after the flowing out of the air from the sleeve and the flowing in of oil.

9. A process as defined in claim 8, further comprising the steps of pressing the pressure piston with punch into the opening position of the sleeve which punch is arranged on a lid closing the vessel.

10. A process as defined in claim 8, further comprising the steps of evacuation the vessel by an air suction opening for the duration of the opening of the sleeve.

* * * * *